(12) United States Patent
Hochman

(10) Patent No.: US 11,386,402 B2
(45) Date of Patent: Jul. 12, 2022

(54) SYSTEM AND METHOD OF DOCUMENTING CONDITION, REPAIR, AND OVERHAUL OF AIRCRAFT PARTS

(71) Applicant: Gary Philip Hochman, Delray Beach, FL (US)

(72) Inventor: Gary Philip Hochman, Delray Beach, FL (US)

(*) Notice: Subject to any disclaimer, the term of this patent is extended or adjusted under 35 U.S.C. 154(b) by 136 days.

(21) Appl. No.: 16/805,014

(22) Filed: Feb. 28, 2020

(65) Prior Publication Data

US 2020/0279214 A1    Sep. 3, 2020

Related U.S. Application Data

(60) Provisional application No. 62/812,626, filed on Mar. 1, 2019.

(51) Int. Cl.
| | |
|---|---|
| *G06Q 10/08* | (2012.01) |
| *G06Q 10/00* | (2012.01) |
| *G06F 16/23* | (2019.01) |
| *G06F 16/248* | (2019.01) |
| *G06F 16/21* | (2019.01) |
| *B64F 5/60* | (2017.01) |

(52) U.S. Cl.
CPC ............... *G06Q 10/20* (2013.01); *B64F 5/60* (2017.01); *G06F 16/219* (2019.01); *G06F 16/2358* (2019.01); *G06F 16/248* (2019.01); *G06Q 10/0833* (2013.01); *G06Q 10/30* (2013.01)

(58) Field of Classification Search
CPC .... G06Q 10/0833; G06Q 10/30; G06Q 10/20; G06F 16/2358; G06F 16/3329; G06F 16/433; G06F 16/248; G06F 16/219; G06F 16/21; G06F 16/23; G06F 11/30; G06F 15/00; Y02W 90/00; B64F 5/60
USPC ......................................................... 705/28
See application file for complete search history.

(56) References Cited

U.S. PATENT DOCUMENTS

| | | | | |
|---|---|---|---|---|
| 5,469,363 A | * | 11/1995 | Saliga ................... | G07F 7/1008 700/225 |
| 6,885,921 B1 | | 4/2005 | Farmer | |
| 7,495,564 B2 | * | 2/2009 | Harold ................. | G07G 1/0045 235/436 |
| 7,571,137 B2 | * | 8/2009 | Alaia ................... | G06Q 10/087 705/35 |
| 7,657,461 B2 | * | 2/2010 | Young ................... | G06Q 40/04 705/26.3 |
| 7,813,966 B2 | * | 10/2010 | Alaia ..................... | G06Q 40/04 705/26.1 |
| 8,078,507 B1 | * | 12/2011 | Rao ..................... | G06K 9/00671 705/27.2 |

(Continued)

*Primary Examiner* — Andrew Joseph Rudy
(74) *Attorney, Agent, or Firm* — Dunlap Bennett & Ludwig, PLLC

(57) ABSTRACT

A system and method of documenting condition, repair, and overhaul of aircraft parts. The system and method include searching a database for an electronic file of an aircraft part; creating an electronic file of the aircraft part if the electronic file is not found on the database; generating a maintenance report data package that is linked to the electronic file; capturing, using a camera or a microphone, aircraft part data including a single or plurality of pictures, a video recording, and a voice recording; linking the aircraft part data to the maintenance report data package; and saving an updated version of the electronic file to the database.

10 Claims, 5 Drawing Sheets

(56) References Cited

U.S. PATENT DOCUMENTS

| | | | | |
|---|---|---|---|---|
| 8,090,462 | B2* | 1/2012 | Wininger | G06Q 10/06 |
| | | | | 700/100 |
| 8,108,271 | B1* | 1/2012 | Duncan | G06Q 40/04 |
| | | | | 705/28 |
| 8,219,558 | B1* | 7/2012 | Trandal | G06Q 10/087 |
| | | | | 707/736 |
| 8,417,590 | B2* | 4/2013 | Carver | B64F 5/60 |
| | | | | 705/28 |
| 8,571,747 | B2* | 10/2013 | Zimpfer | G06Q 10/20 |
| | | | | 701/29.1 |
| 9,008,892 | B2* | 4/2015 | Bollapragada | G07C 5/006 |
| | | | | 701/29.1 |
| 9,620,020 | B2* | 4/2017 | Wang | G06F 3/16 |
| 9,916,701 | B2* | 3/2018 | Angus | G07C 5/006 |
| 10,292,011 | B2* | 5/2019 | Johnson | H04L 67/104 |
| 10,331,920 | B2* | 6/2019 | Lupoli | G06F 16/903 |
| 11,030,828 | B2* | 6/2021 | Amit | G06Q 10/06 |
| 2002/0007326 | A1* | 1/2002 | Hashimoto | G06Q 20/203 |
| | | | | 705/28 |
| 2005/0055239 | A1 | 3/2005 | Farmer | |
| 2007/0200675 | A1* | 8/2007 | Kimura | G06Q 30/06 |
| | | | | 340/5.92 |
| 2007/0250411 | A1 | 10/2007 | Williams | |
| 2007/0276928 | A1 | 11/2007 | Rhoads et al. | |
| 2008/0270178 | A1* | 10/2008 | McRae | G16H 10/60 |
| | | | | 705/2 |
| 2015/0039402 | A1* | 2/2015 | Madison | G06Q 10/06398 |
| | | | | 705/7.42 |

* cited by examiner

SYSTEM AND METHOD OF DOCUMENTING CONDITION, REPAIR, AND OVERHAUL OF AIRCRAFT PARTS

CROSS-REFERENCE TO RELATED APPLICATION

This application claims the benefit of priority of U.S. provisional application No. 62/812,626, filed Mar. 1, 2019, the contents of which are herein incorporated by reference.

BACKGROUND OF THE INVENTION

The present invention relates to aircraft part maintenance and, more particularly, to a system and method of documenting condition/repair/overhaul of aircraft parts.

When aircrafts are parted out or a part or engine fails on a current flying aircraft, repairs will be needed. Currently, airlines, maintenance, repair, overall (MRO's), and owner operators may either buy a new part or repair the part. The government mandated documentation process today is a paper-based trace document that is filled out by the service technician. The documents contain the part number, part serial number, and the aircraft it was removed from. To date there is no standardized and automated digital photographic, video or digital voice recording capabilities at the field, office, parts, or repair shop.

As can be seen, there is a need for a system and method of documenting condition/repair/overhaul of aircraft parts.

SUMMARY OF THE INVENTION

In one aspect of the present invention, a method of documenting condition/repair/overhaul of aircraft parts, the method comprises steps of: entering, using a computing system, at least one identification number for an aircraft part; searching, using the computing system, a database for an electronic file of the aircraft part using the at least one identification number; creating, using the computing system, the electronic file of the aircraft part if the electronic file is not found on the database, wherein the at least one identification number is linked to the electronic file; generating, using the computing system, a maintenance report data package, wherein the maintenance report data package is linked to the electronic file; capturing, using at least one of a camera and a microphone, aircraft part data comprising at least one of a single or plurality of pictures, a video recording, and a voice recording; inking, using the computing system, the aircraft part data to the maintenance report data package; and saving, using the computing system, an updated version of the electronic file to the database.

In another aspect of the present invention, a system of documenting condition/repair/overhaul of aircraft parts, the system comprises: a database storing a search pool that includes a plurality of electronic files each comprising data of a different aircraft part; at least one computing device including a processor and a memory for storing instructions that, when executed by the processor, cause the processor to perform operations comprising: searching the database for an electronic file of the plurality of electronic files of an aircraft part using at least one identification number; creating the electronic file of the aircraft part if the electronic file is not found on the database, wherein the at least one identification number is linked to the electronic file; generating a maintenance report data package, wherein the maintenance report data package is linked to the electronic file; capturing, using at least one of a camera and a microphone, aircraft part data comprising at least one of a single or plurality of pictures, a video recording, and a voice recording; linking the aircraft part data to the maintenance report data package; and saving an updated version of the electronic file to the database.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a universal digital photo capture, digital video capture, and digital sound capture for aircraft parts condition, testing, repair, overhaul, tracking, and compliance using smartphones, tablets, personal digital assistant (PDA), portable computers, and any capture capable device.

The present invention enables digital photo, digital video, and digital voice recording to be related to the part being serviced using a universal tracking system and file cross referencing methodologies. The present invention prompts the technician to take one or several pictures, videos, and voice recordings in a pre-configured standardized method and in a selected order. Additionally, the present invention names the recorded files in relation to the part and its repair process from off of the wing to the repair shop to the warehouse to back on the wing. The digital photo, digital video, and digital voice recording files and records related to the parts are linked with a lifetime trace document database as part of the Back To Birth (BTB) history of that part and made globally available and shared via local, networked, or cloud based systems.

The present invention provides solutions to problems in the aviation repair/overhaul and trading industry. The new method provides standardization for file naming and automates the process. The present invention further creates a new level of sharing and tracking capability previously not available. The present invention allows for the documentation of the condition of parts removed, shipped, received, and repaired. The present invention provides a BTB and full part life photo, video, and voice recording library. The present invention helps the Federal Aviation Administration (FAA) in the case of part failures and finding the handling and service problems and people associated with the part in a globally available database.

Figure 1:
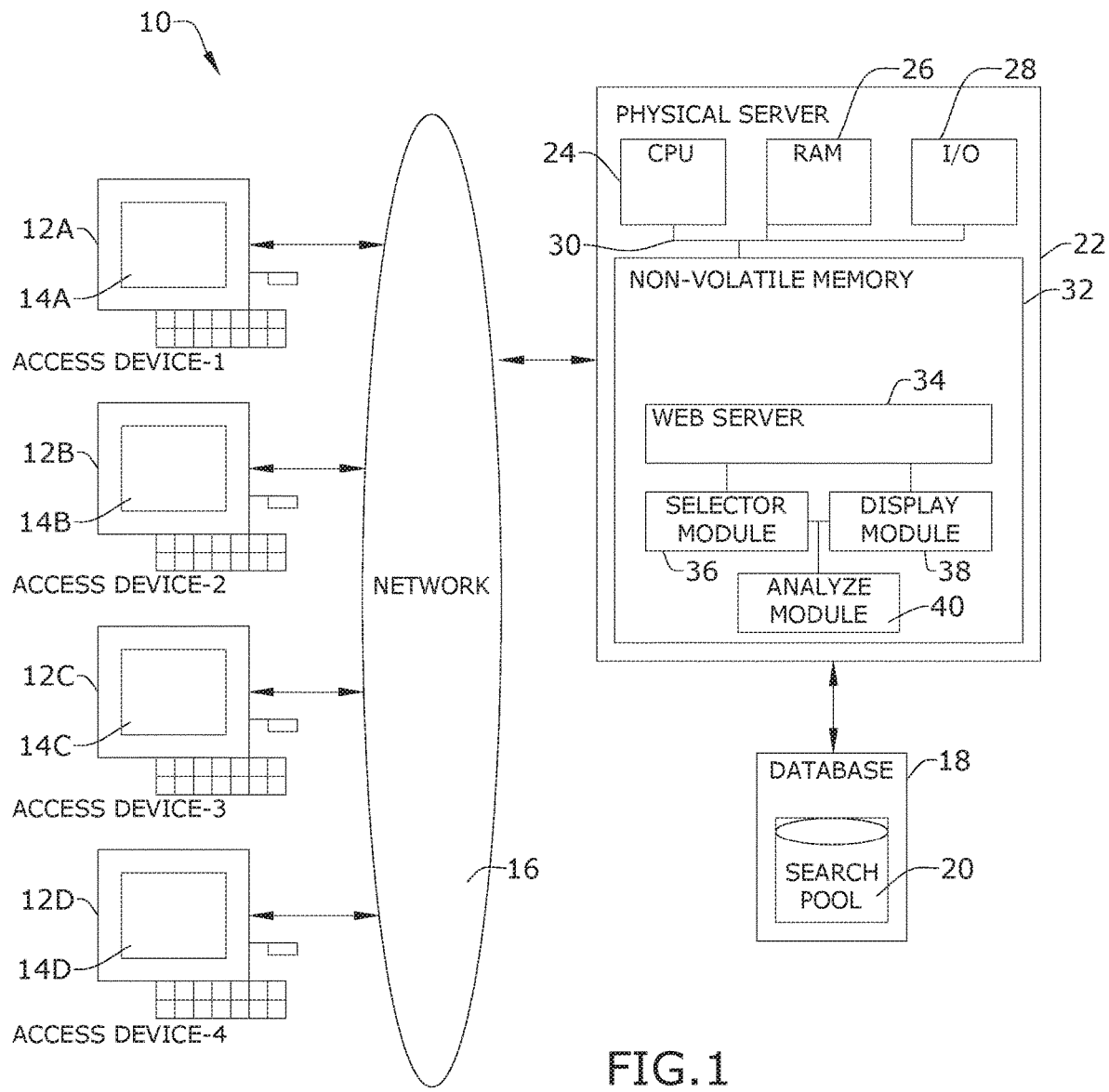
FIG. 1 is a schematic view of an embodiment of the present invention.
Figure 2:
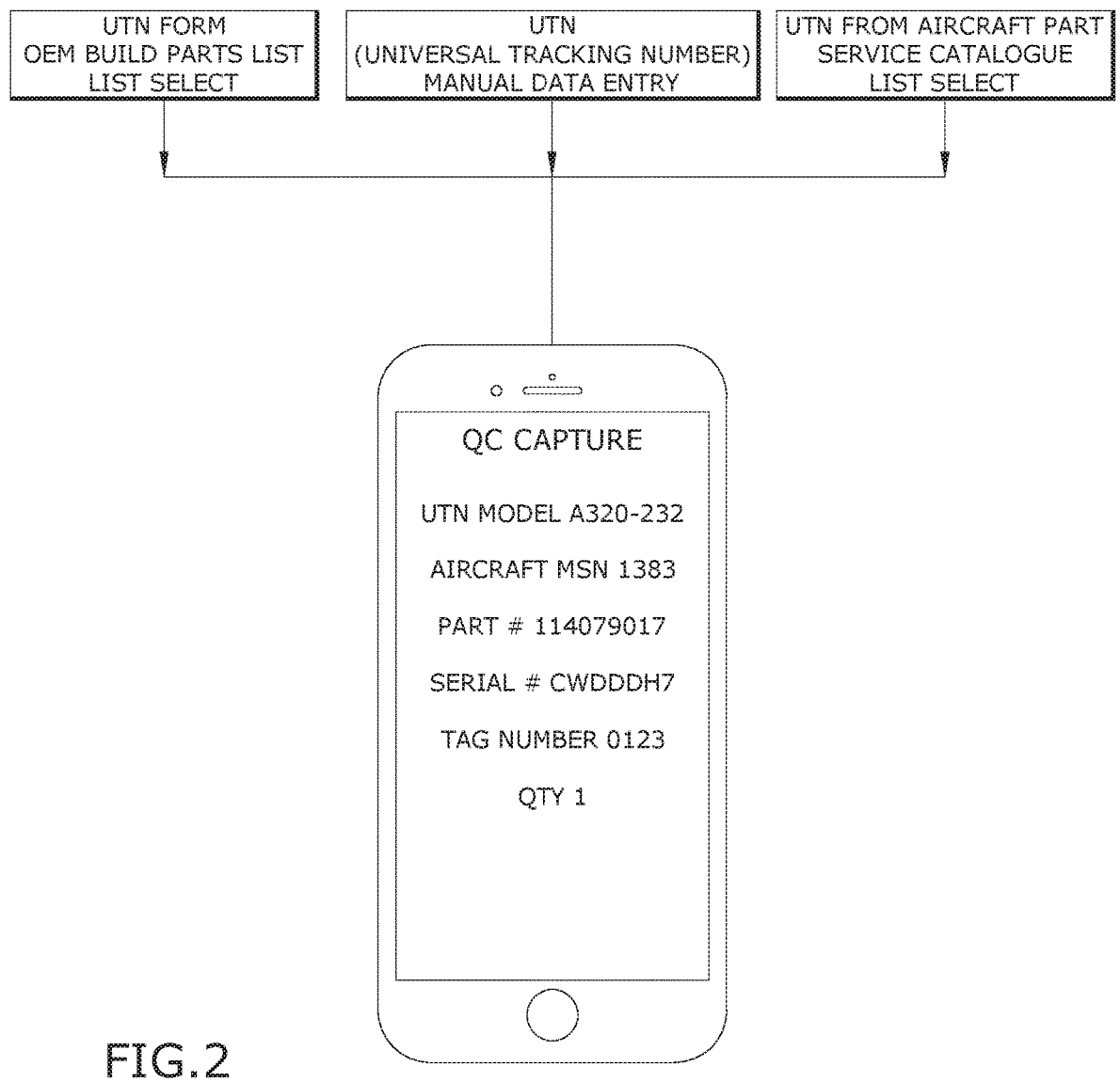
FIG. 2 is a schematic view of an embodiment of the present invention.
Figure 3:
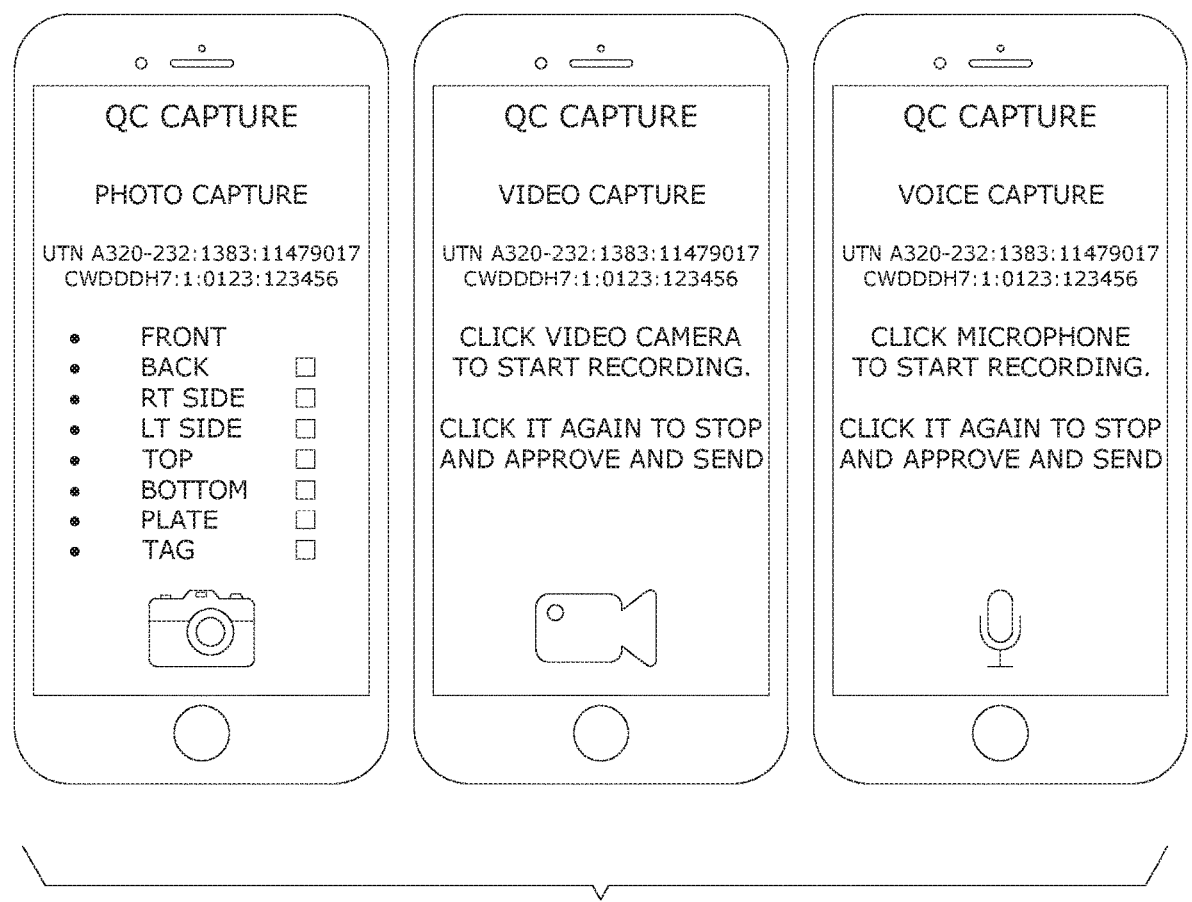
FIG. 3 is a schematic view of an embodiment of the present invention.
Figure 4:
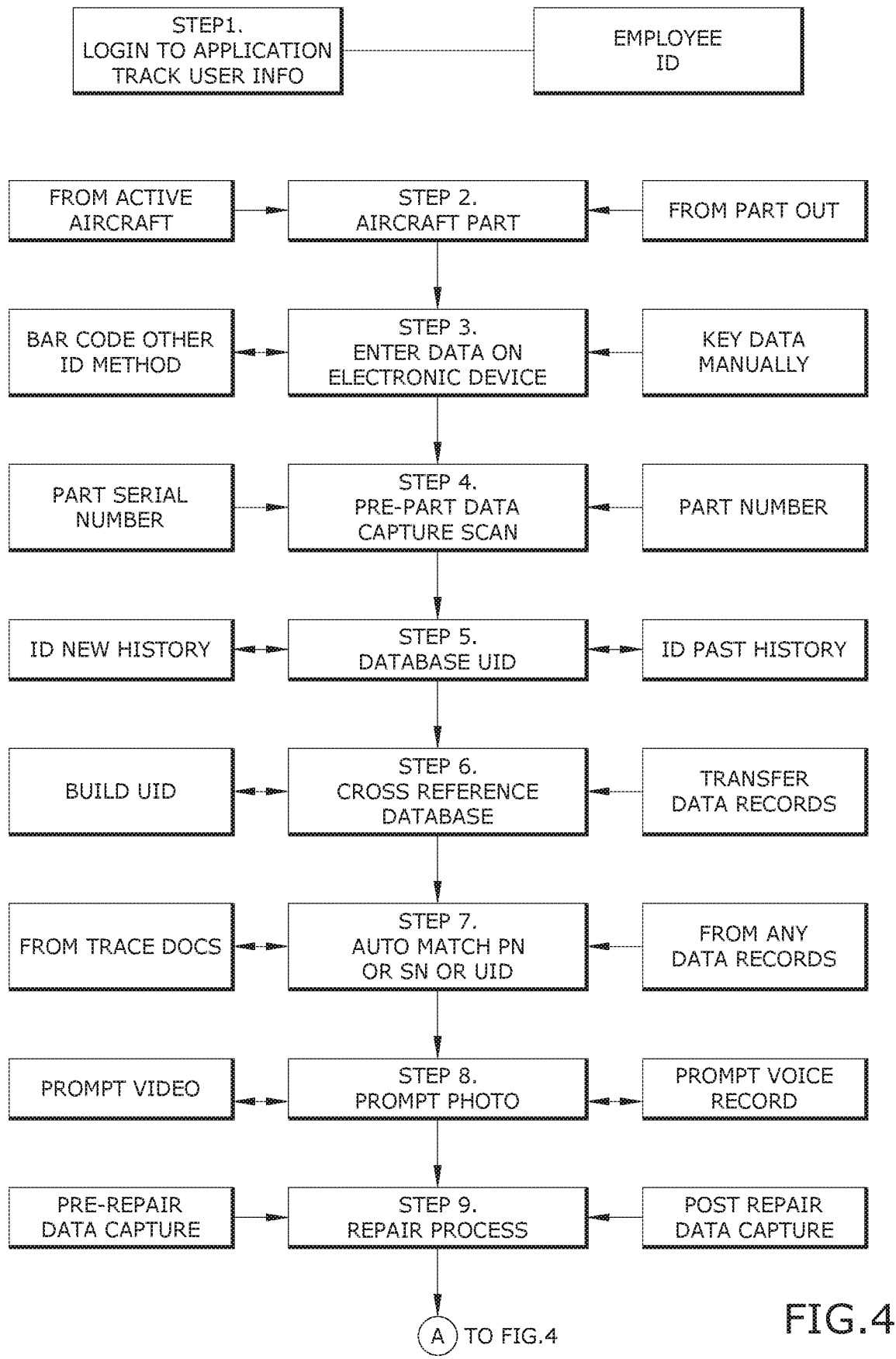
FIG. 4 is a flow chart of an embodiment of the present invention.
Figure 5:
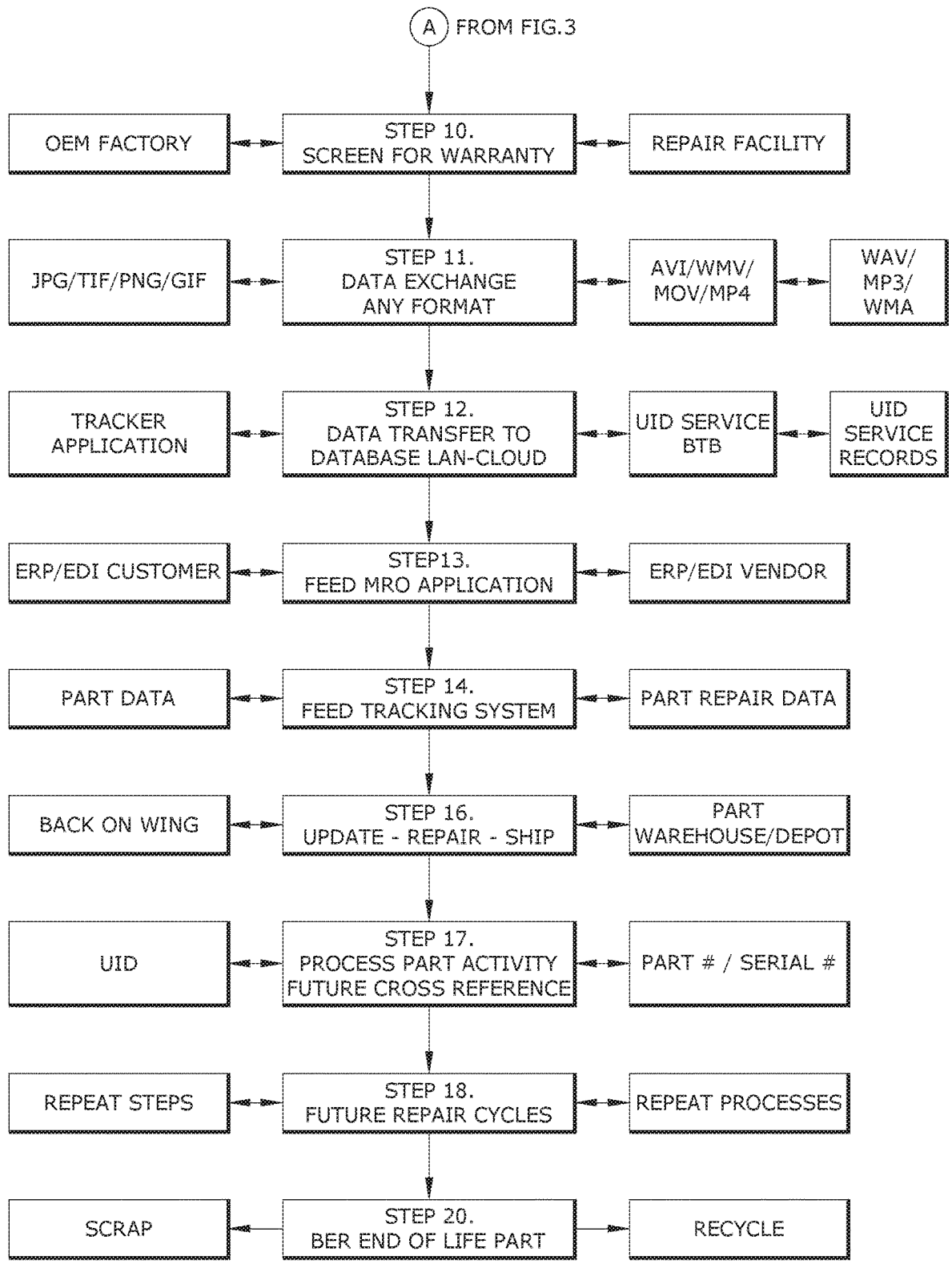
FIG. 5 is a continuation of the flow chart of FIG. 4.

Referring to FIG. 1, the system 10 includes a server 22 that searches for, generates, and updates aircraft part files in response to requests from access devices 12A-D. The access devices 12A-D may be a computing device, such as but not limited to, a smart phone, a tablet, a PDA, a desktop, a laptop, and the like. As shown in FIG. 1, a user using an access device 12A-D over a network 16 can access the server 22 to search for, generate, and update aircraft part files via a web browser or an application 14A-D loaded on a memory of the access device 12A-D. Although only four access devices are illustrated in FIG. 1, the system 10 can be configured to support various numbers of access devices.

Network 16 can include various devices such as servers, routers, and switching elements that can be connected in an extranet, intranet or Internet configuration. In some implementations, the network 16 uses wired communications to transfer information to and from the access devices 12A-D and the server 22. In other implementations, the network 16 uses wireless communication protocols. In yet other implementations, the network 16 uses a combination of wired and wireless communication protocols Database 18 stores the aircraft part files in the form of data packages accessible to the server 22. In one preferred embodiment, the database 18 is a relational database that maintains the aircraft part files in a search pool 20. In another preferred embodiment, the database 18 is a directory server, such as a Lightweight Directory Access Protocol ('LDAP') server, that maintains the aircraft part files in the search pool 20. In other implementations, the database 18 and search pool 20 are a configured area in the non-volatile memory 32 of the server 22 that maintains the aircraft part files information.

As shown in FIG. 1, the server 22 includes a central processing unit ('CPU') 24, random access memory ('RAM') 26, non-volatile memory 32 and an input-output device 28, all of which are interconnected via a bus line 30 and controlled by the CPU 24. The non-volatile memory 32 is configured to include a web server 34 to communicate with access devices 12A-D, a selector module 36 to determine search features associated with aircraft parts in the search pool 20, an analyze module 40 to identify aircraft part files from the search pool 20 and a display module 38 to display pictures, videos, and text data within a selected aircraft part file.

Web server 34 manages communications between the access devices 12A-D and the server 22. Preferably, the web server 34 is configured to send and receive information in the form of web pages to any of the browsers or applications 14A-D in response to a request. The web server 34 communicates with each web browser or application 14A-D and software modules 36, 38 and 40 using one or more communication protocols, such as HTTP (Hyper Text Markup Language). In one preferred embodiment, for example, the web server 34 is configured to include the Apache HTTP Server from the Apache Software Foundation. In another preferred embodiment, the web server 34 includes Internet Information Services (IIS) from Microsoft Corporation. In yet another preferred embodiment, the web server 34 includes the Sun Java System Web Server from Sun Microsystems.

Referring to FIGS. 2 through 5, a user uses one of the access devices to communicate with the server and generate a maintenance report data package for an aircraft part file of an aircraft part. A user may be prompted to create a new maintenance report data package when the aircraft part is removed from an aircraft, before the aircraft part is shipped from an airline to a repair vendor, when the repair vendor receives the aircraft part from the airline, after the aircraft part is repaired, before the aircraft part is shipped back from the repair vendor to the airline, when the airline receives the aircraft part back from repair vendor, and/or before the aircraft part is placed back on the aircraft.

A user may first create a username and password using personal identifying information. The user logs into the web server prior to creating a new maintenance report data package. The personal identifying data is linked to each created maintenance report data package. Therefore, if there are any issues with the aircraft part, a record of which user created what maintenance report data package is kept throughout the lifetime of the aircraft part.

The new maintenance report data package is created when a user is handling an aircraft part from either a part out or from an active aircraft. After the user has logged into the web server, the user may enter identifying information of the aircraft part on the access device, which may be done by scanning barcodes, RFID tags, or keying in the data manually. The identification information may include but is not limited to, a part number, a serial number, a tag number, an airplane manufacturer's serial number, or a combination thereof. In certain embodiments, a universal tracking number for the electronic file of the aircraft part may be generated. The universal tracking number may be a combination of the part number, the serial number, the tag number, and the airplane manufacturer's serial number that the aircraft part was pulled from. The universal tracking number may be used during the lifetime of the aircraft part for searching, tracking, and verifying documentation history.

The database is searched for an electronic file of the aircraft part that matches the entered identifying information. If no electronic file is found, the present invention further includes creating a new electronic file of the aircraft part linked with the universal tracking number. If an electronic file is found, the new generated maintenance report data package may be linked to the electronic file, and an updated version of the electronic file is saved to the database.

The user is then prompted to capture aircraft part data including a single or plurality of pictures of the aircraft part, a video recording of the aircraft part, and a voice recording. Once the aircraft part data is captured, the data files are automatically renamed to include identifying information of what was captured and the universal tracking number or other preferred naming schema. This way the aircraft part data is linked to the maintenance report data package, which is in turn linked to the electronic file for the respective aircraft part.

Technicians can use any of the methods used in the field or previous steps and then take pictures, record videos or record voice messages that is added to that particular maintenance report data package which can be historically traced in the future. The present invention allows for pre-repair capture of the aircraft part and a post repair capture of the aircraft part, which is all added as a separate maintenance report data package to the electronic file.

In certain embodiments, previous warranties as identification of billable and non-billable warranty repair work may be searched for. Warranty information may be entered by the part owner in any database to use this functionality.

All of the captured files are sorted and stored based on their file formats from the capture devices. The present invention may provide for file conversions for standardization, files size limits and file compression to reduce storage costs and file transfer times.

All of the information is placed in the identified files and stored locally or in a cloud based database for cross referencing and data exchange and history BTB trace. It also can coordinate repair with MRO tracking and other third party application. The electronic files may be fed to EDI (Electronic Data Exchange) applications, which allows the transfer of data to users and third-party ERP systems. The present invention further includes the process to exchange aircraft part data and repair data to track and trace applications. The electronic files are updated after the repairs are completed and the part is shipped to the aircraft part owner location or third party location and the data of the shipment is included in the trace records. The aircraft part may go through transfer and repair several times until the aircraft part has reached the end of its life with cross referenced data. The steps listed above may be repeated for the same aircraft parts. Once the aircraft part is the BER (Beyond Economical Repair) end of life cycle and the aircraft part is destroyed and/or recycled, ending the parts life history and updating the electronic file to recognize the aircraft parts decommission.

This methodology is revolutionary for the aviation industry in terms of processes. Users login first to an application or web browser for the identification and tracking of the aircraft part. Additionally, users add personal identification information for user accountability. The user is responsible for the quality and completeness of the data that is entered. Similar to any application in the aviation industry which is an FAA and other government and country mandated quality control process, the present invention requires proper identification of the user for photo, video and voice recording as it does for paper based documents signed by the originator. Once the first step is complete, the next steps in the process are dependent on its previous step and requirements. Each step captures an element of data to accommodate the record of the aircraft part. Some steps require integration to other databases, yet the application provides for manually data entry, so third-party databases are not the only source of information input.

Data capture in some of the steps can be automated to use existing data reading applications such as bar code and RFID technology. The data may be captured using off the shelf technology or can be customized to meet the needs and data security and exchange requirements of any organization. The steps in the methodology are easy to understand and use accepted practices of the aviation industry.

One of the main ideas in this methodology and covered by the elements of the present invention is the concept of data or file naming push vs pull in the methodology. With the steps in this new methodology the application steps prompt user identification for the application and the manual entry of data or choosing from a database before a picture video or voice recording is made. The application in the steps create a Universal ID or can use an existing ID. The methodology of the present invention can apply a file naming schema that makes sense to the user, the company, and the industry as a newly created standard. What is also unique in the step by step process is the detail to data exchange enhancing the trace standards used today to document part conditions. The present invention provides for tackling the file type and file size variations of photo, video, and voice recording which vary by computer operating systems and photo, video and voice recording computer mobile devices using different manufacturer operation systems. Another function in the step process is tracking and the sharing of data with EDI and ERP systems worldwide. The final steps also provide for a part lifetime data trail with the addition of photo, video, and voice recording now being added to the part trace documentation from birth (first repair) to death (last repair), which is able to be exchange worldwide.

The following include a list of benefits provided by an embodiment of the present invention:

- Adds Pull Photo vs Push photos documentation capabilities.
- Adds Pull Video documentation capabilities. Adds Pull Voice recording documentation capabilities.
- Improve Part out and Line Maintenance applications
- Improved QC on all parts owned by the airline, MRO or OEM.
- Improve Safety and Compliance on aircraft parts.
- Improved compliance—new Photo Video and Voice Recording Standard.
- Ability to identify and track shipping damages of parts between the airline and its repair vendors.
- Advanced QC information on condition of part and needed parts for repairs by description and photo/video/voice capture currently not available in the industry.
- Shorten Repair Turn Around Times—See condition of part before it arrives at shop and pre order and schedule repairs.
- Documents the condition of the part into a shop pre repair.
- New standardization of photo/video/voice capture for the life of a part or part exchange (Pixels-file size-compression).
- Faster repair and overhaul turnaround time (technician can describe failure or damage via the application and this information can arrive before the part arrives at the shop speeding up the repair process). Proactive vs Reactive repairs.
- Increased asset value of a well-documented part with photo/video/voice capture files vs a part without the documentation.
- Identify any connectors or accessorizes attached or missing from the part.
- Can integrate into airline, MRO and asset owners existing Identification and tracking system.
- It enables failed or unrepairable parts to be better documented.
- Documents the condition of the part post repair and shipment (can be used in marketing).
- Will be full supported by b2b-aero.com MRO tracker EDI application for data exchange.
- Can be used in block chain documentation support.
- Can be OEM or third party integrated.
- Can be FAA, EASA, CAAC, ARSA, ASA integrated.
- Universal Mobile applications—will run on IPHONES™, IPADS™ ANDROID™, WINDOWS™ or other operating systems or portable devices with camera, video and voice recording capability.
- Creates Jpeg, Way, Q file, MOV and other file format standardization.
- Enables high resolution image capture and conversion.
- Can follow an aircraft part from off wing to back on wing even with exchanges on different airline aircraft. (Global Tracking).
- New levels of part Safety.
- Improved and traceable part repair compliance.
- Use 3D cameras, infrared or any new and improved camera and image/video and sound technology.

It should be understood, of course, that the foregoing relates to exemplary embodiments of the invention and that modifications may be made without departing from the spirit and scope of the invention as set forth in the following claims.

What is claimed is:

1. A method of documenting condition, repair, or overhaul of aircraft parts, the method comprising steps of:

entering, using a computing system, at least one identification number for an aircraft part, wherein the at least one identification number comprises a part number, a serial number, a tag number, an airplane manufacturer's serial number, or a combination thereof;

searching, using the computing system, a database for an electronic file of the aircraft part using the at least one identification number;

creating, using the computing system, the electronic file of the aircraft part if the electronic file is not found on the database, wherein the at least one identification number is linked to the electronic file;

receiving, by way of the computing system, a universal tracking number for the electronic file of the aircraft part;

generating, using the computing system, the universal tracking number if the electronic file was not found, and linking the universal tracking number with the at least one identification number;

generating, using the computing system, a maintenance report data package, wherein the maintenance report data package is linked to the electronic file;

entering, in response to and using the computing system, personal identifying data of a user generating the maintenance report data package, and linking, using the computing system, the personal identifying data to the maintenance report data package;

entering, in response to and using the computing system, status identifying data of the aircraft part, and linking, using the computing system, the status identifying data to the maintenance report data package;

capturing, using at least one capture device, wherein the at least one capture device comprises at least one of a camera and a microphone, aircraft part data comprising at least one of at least one picture, a video recording, and a voice recording;

creating a filing name for each aircraft part data, wherein the filing name consists of the personal identifying data, the status identifying data, the universal tracking number, and data associated with the capture device;

wherein the status identifying data is selected from the group consisting of a pre-removed status, a pre-shipped to vendor status, a vendor received status, a post repair status, a pre-shipped back status, an airline received status and a pre-placed back status;

linking, using the computing system, the filing name to the maintenance report data package; and saving, using the computing system, an updated version of the electronic file to the database, whereby all data captured is placed in a pooled and networked database compiling current data files with historical datafile residing or located in one or more third-party servers.

2. The method of claim 1, wherein the at least one picture is a plurality of pictures comprising pictures of each side of the aircraft part.

3. The method of claim 1, wherein the each of the steps are performed after the aircraft part is removed from an aircraft, after the aircraft part is repaired, and before the aircraft part is placed back on the aircraft.

4. The method of claim 3, wherein each of the steps are also performed before the aircraft part is shipped from an airline to a repair vendor and before the aircraft part is shipped back from the repair vendor to the airline.

5. The method of claim 1, wherein the computing system comprises at least one access device and a remote server communicating over a network.

6. A system of documenting condition, repair, or overhaul of aircraft parts, the system comprising:

a database storing a search pool that includes a plurality of electronic files each comprising data of a different aircraft part, wherein the at least one identification number comprises a part number, a serial number, a tag number, an airplane manufacturer's serial number, or a combination thereof;

at least one computing device including a processor and a memory for storing instructions that, when executed by the processor, cause the processor to perform operations comprising:

searching the database for an electronic file of the plurality of electronic files of an aircraft part using at least one identification number;

creating the electronic file of the aircraft part if the electronic file is not found on the database, wherein the at least one identification number is linked to the electronic file;

receiving, by way of the computing system, a universal tracking number for the electronic file of the aircraft part;

generating, using the computing system, the universal tracking number if the electronic file was not found, and linking the universal tracking number with the at least one identification number;

generating a maintenance report data package, wherein the maintenance report data package is linked to the electronic file;

entering, using the computing system, personal identifying data of a user generating the maintenance report data package, and linking, using the computing system, the personal identifying data to the maintenance report data package;

entering, in response to and using the computing system, status identifying data of the aircraft part, and linking, using the computing system, the status identifying data to the maintenance report data package;

capturing, using at least one capture device, wherein the at least one capture device comprises at least one of a camera and a microphone, aircraft part data comprising at least one of at least one picture, a video recording, and a voice recording;

creating a filing name for each aircraft part data, wherein the filing name consists of the personal identifying data, the status identifying data, the universal tracking number, and data associated with the capture device;

wherein the status identifying data is selected from the group consisting of a pre-removed status, a pre-shipped to vendor status, a vendor received status, a post repair status, a pre-shipped back status, an airline received status and a pre-placed back status;

subsequently causing the processor to perform operations comprising:

linking the filing name to the maintenance report data package; and saving an updated version of the electronic file to the database, whereby all data captured is placed in a pooled and networked database compiling current data files with historical datafile residing or located in one or more third-party servers.

7. The system of claim 6, wherein the processor further performs operations comprising: a text box to receive and save notes from the user.

8. The system of claim 6, wherein the at least one picture comprises a plurality of pictures comprising pictures of each side of the aircraft part.

9. The system of claim 6, wherein the at least one computing device comprises an access device and a remote server communicating over a network.

10. The system of claim 6, wherein the at least one picture, the video recording and the voice recordings are automatically watermarked when generated.

\* \* \* \* \*